United States Patent

Malhotra et al.

[11] Patent Number: 6,027,555
[45] Date of Patent: *Feb. 22, 2000

[54] HOT MELT INK COMPOSITIONS

[75] Inventors: Shadi L. Malhotra; Danielle C. Boils, both of Mississauga, Canada

[73] Assignee: Xerox Corporation, Stamford, Conn.

[*] Notice: This patent is subject to a terminal disclaimer.

[21] Appl. No.: 09/306,972

[22] Filed: May 7, 1999

Related U.S. Application Data

[63] Continuation of application No. 08/933,914, Sep. 23, 1997.

[51] Int. Cl.[7] .................................................. C09D 11/00
[52] U.S. Cl. .................................... 106/31.29; 106/31.61; 106/31.43; 106/31.75
[58] Field of Search ........................... 106/31.29, 31.61, 106/31.43, 31.75, 31.58, 31.86

[56] References Cited

U.S. PATENT DOCUMENTS

| | | | |
|---|---|---|---|
| 5,017,225 | 5/1991 | Nakanishi et al. | 106/31.21 |
| 5,069,719 | 12/1991 | Ono | 106/31.58 |
| 5,098,477 | 3/1992 | Vieira et al. | 106/31.27 |
| 5,151,120 | 9/1992 | You et al. | 106/31.29 |
| 5,302,439 | 4/1994 | Malhotra et al. | 428/195 |
| 5,409,530 | 4/1995 | Kanbayashi et al. | 106/31.29 |
| 5,451,458 | 9/1995 | Malhotra | 428/412 |
| 5,709,976 | 1/1998 | Malhotra | 430/124 |
| 5,876,492 | 3/1999 | Malhotra et al. | 106/31.58 |
| 5,902,390 | 5/1999 | Malhotra et al. | 106/31.58 |
| 5,922,117 | 7/1999 | Malhotra et al. | 106/31.58 |

*Primary Examiner*—Mark L. Bell
*Assistant Examiner*—Veronica F. Faison
*Attorney, Agent, or Firm*—E. O. Palazzo

[57] ABSTRACT

A ink composition comprised of (1) a liquid cyclic vehicle (2) a cyclic compound, (3) a liquid crystalline nitrile compound, (4) a lightfastness UV absorber, (5) a lightfastness antioxidant, and (6) a colorant.

7 Claims, No Drawings

HOT MELT INK COMPOSITIONS

This application is a continuation of application Ser. No. 08/933,914, filed Sep. 23, 1997.

REFERENCE TO COPENDING PATENT APPLICATIONS AND PATENTS

Hot melt inks are illustrated in U.S. Pat. No. 5,683,312, U.S. Pat. No. 5,667,568, U.S. Pat. No. 5,700,316, U.S. Pat. No. 5,747,554, and U.S. Ser. No. 641,866 (D/95458), the disclosures of each being totally incorporated herein by reference.

Disclosed in copending applications filed currently herewith, U.S. Ser. Nos. 08/935,929, 08/935,889, 08/935,639 and 08/936,084, the disclosures of each application being totally incorporated herein by reference, are hot melt inks.

Ink components, such as the colorants, of the copending applicaitons may be selected for the inks of the present invention in embodiments thereof.

BACKGROUND OF THE INVENTION

The present invention is directed to ink compositions and, more specifically, the present invention relates to hot melt inks with for example, a melting point of between about 25° C. and about 50, and preferably about 40° C., and which inks are especially useful for acoustic ink printing, processes and apparatuses, reference, for example, U.S. Pat. No. 5,121,141, U.S. Pat. No. 5,111,220, U.S. Pat. No. 5,128,726, U.S. Pat. No. 5,371,531, the disclosures of which are totally incorporated herein by reference, including especially acoustic ink processes as illustrated in some of the aforementioned copending applications and patents, such as an acoustic ink printer for printing images on a record medium.

The inks of the present invention in embodiments thereof are comprised of (1) a liquid non-aqueous vehicle with for example, a boiling point of higher than, or equal to about 150° C. (Centigrade) and lower than, or equal to about 350° C., and more sepcifically from about 175 to about 325, and yet more specifically from about 225 to about 300 degrees Centigrade, with a low acoustic loss, which enables for example, a reduction, or minimzation of energy consumption, and which acoustic loss is below, or about equal to about 60 dB/mm, (2) a solid color spreading compound, or paper additive contained in the substrate, such as the paper pores, and which compound has a melting point of lower than, or equal to about 75° C. and preferably between about 30 to about 74° C., and with a low acoustic loss value of below about, or equal to about 100 dB/mm, (3) a nitrile liquid crystalline compound, (4) a light fastness UV absorber, (5) a light fastness antioxidant, (6) and a colorant such as a dye, a pigment or mixtures thereof. More specifically, the present invention is directed to semi-solid hot melt acoustic ink compositions comprised of (1) non-aqueous liquid vehicles with a boiling point of higher than about 150° C. and lower than about 350° C., preferably between about 170 to about 300° C., and with low acoustic loss, and which acoustic loss is below about, or equal to about 60 dB/mm, and preferably in the range of between about 5 to about 40 dB/mm, (2) a non-aqueous solid, preferably cyclic additive with a melting point of lower than about 75° C. and preferably between about 30 and about 74° C., and with low acoustic loss and which acoustic loss is below about, or equal to about 100 dB/mm, and preferably in the range of between about 25 to about 80 dB/mm, (3) a liquid crystalline nitrile compound, (4) a UV absorber, (5) an antioxidant, and (6) a colorant, and wherein there can be generated with such inks excellent developed images on plain and coated papers with acceptable image permanence, excellent projection efficiency on transparencies without a post fusing step, and excellent crease resistance, and wherein the inks possess acceptable, and in embodiments superior lightfastness, and superior waterfastness. Moreover, in embodiments of the present invention there is enabled the elimination, or minimization of undesirable paper curl since water is not present, or minium amounts of water may be selected in embdoiments, and it is preferred that there be an absence of water. When water is not present in the inks a dryer can be avoided thereby minimizing the cost of the acoustic ink jet apparatus and process.

PRIOR ART

In acoustic ink printing, the printhead produces approximately 2.2 picoliter droplets by an acoustic energy process. The ink under these conditions should display a melt viscosity of from about 5 to about 20 centipoise or less at the jetting temperature. Furthermore, once the ink is jetted onto the paper, the ink image should be of excellent crease property, and should be nonsmearing, waterfast, of excellent transparency and excellent fix qualities. In selecting an ink for such applications, it is desirable that the vehicle display a low melt viscosity, such as from about 1 centipoise to about 25 centipoise in the acoustic head, while also displaying solid like properties after being jetted onto paper. Since the acoustic head can tolerate a temperature up to about 180° C., and preferably up to a temperature of from about 140° C. to about 160° C., the vehicle for the ink should preferably display liquid like properties, such as a viscosity of 1 to about 10 centipoise at a temperature of from about 75° C. to about 165° C., and solidify or harden after jetting onto paper such that the ink displays a hardness value of for example, from about 0.1 to about 0.5 millimeter utilizing a penetrometer according to the ASTM penetration method D1321.

Ink jet printing processes that employ inks that are solid at room temperature and liquid at elevated temperatures are known. For example, U.S. Pat. No. 4,490,731, the disclosure of which is totally incorporated herein by reference, discloses an apparatus for dispensing certain solid inks for printing on a substrate such as paper. The ink dye vehicle is chosen to have a melting point above room temperature so that the ink which is melted in the apparatus will not be subject to evaporation or spillage during periods of non-printing. The vehicle selected possesses a low critical temperature to permit the use of the solid ink in a thermal ink jet printer. In thermal ink jet printing processes employing semi-solid hot melt inks, the solid ink is melted by a heater in the printing apparatus and utilized as a liquid in a manner similar to that of conventional thermal ink jet printing. Upon contact with the printing substrate, the molten ink solidifies rapidly, enabling the dye to remain on the surface instead of being carried into the paper by capillary action, thereby attempting to enable higher print density than is generally obtained with liquid inks. Semi-solid hot melt ink jets are somewhat similar to thermal ink jets, however, a semi-solid hot melt ink contains no solvent. Thus, rather than being liquid at room temperature, a semi-solid hot melt ink is typically a solid or semi-solid having a wax-like consistency. These inks usually need to be heated, for example, to approximately 100° C. before the ink melts and turns into a liquid. With semi-solid hot melt inks, a plurality of ink jet nozzles are provided in a printhead. A piezoelectric vibrating element is located in each ink channel upstream from a nozzle so that the piezoelectric oscillations propel ink through the nozzle. After the semi-solid hot melt ink is applied to the substrate, the ink is resolidified by freezing on the substrate.

Each of these types of known ink jets, however, has a number of advantages and disadvantages. One advantage of thermal ink jets is their compact design for the integrated electronics section of the printhead. Thermal ink jets are disadvantageous in that the thermal ink has a tendency to soak into a plain paper medium. This blurs the print or thins out the print locally thereby adversely affecting print quality. Problems have been encountered with thermal ink jets in attempting to eliminate moisture fast enough so that the ink does not soak into a plain paper medium. This is particularly the situation when printing with color.

One advantage of a semi-solid hot melt ink jet is its ability to print on plain paper since the semi-solid hot melt ink quickly solidifies as it cools and, as it is waxy in nature it does not normally soak into a paper medium. However, semi-solid hot melt ink jets can be cumbersome in structure and in design, that is, the associated integrated electronics of a thermal ink jet head are considerably more compact than those of a semi-solid hot melt ink jet head.

In addition, U.S. Pat. No. 4,751,528, the disclosure of which is totally incorporated herein by reference, discloses a semi-solid hot melt ink jet system which includes a temperature-controlled platen provided with a heater and a thermoelectric cooler electrically connected to a heat pump and a temperature control unit for controlling the operation of the heater and the heat pump to maintain the platen temperature at a desired level.

Further, U.S. Pat. No. 4,791,439, the disclosure of which is totally incorporated by reference, discloses an apparatus for use with semi-solid hot melt inks with an integrally connected ink jet head and reservoir system, the reservoir system including a highly efficient heat conducting plate inserted within an essentially nonheat conducting reservoir housing.

Ink compositions for ink jet printing are known. For example, U.S. Pat. No. 4,840,674, the disclosure of which is totally incorporated herein by reference, discloses an ink composition which comprises a major amount of water, an organic solvent selected from the group consisting of tetramethylene sulfone, 1,1,3,3-tetramethyl urea, 3-methyl sulfolane, and 1,3-dimethyl-2-imidazolidone, which solvent has permanently dissolved therein spirit soluble dyes.

U.S. Pat. No. 5,006,170 and U.S. Pat. No. 5,122,187, the disclosures of each of which are totally incorporated herein by reference, disclose hot melt ink compositions suitable for ink jet printing which comprise a colorant, a binder, and a propellant such as hydrazine, cyclic amines, ureas, carboxylic acids, sulfonic acids, aldehydes, ketones, hydrocarbons, esters, phenols, amides, imides, halocarbons, and the like.

U.S. Pat. No. 5,041,161, the disclosure of which is totally incorporated herein by reference, discloses an ink jet ink which is semi-solid at room temperature. The inks comprise vehicles, such as acids, aldehydes and mixtures thereof, which are semi-solid at temperatures between 20° C. and 45° C. The ink is impulse jetted at an elevated temperature in the range of about 45° C. to about 110° C., at which temperature the ink has a viscosity of about 10 to 15 centipoise. The inks also contain 0.1 to 20 weight percent of a colorant system.

U.S. Pat. No. 4,853,036 and U.S. Pat. No. 5,124,718 disclose an ink for ink jet recording which comprises a liquid composition essentially comprising a coloring matter, a volatile solvent with a vapor pressure of 1 millimeter Hg or more at 25° C., and a compound being solid at room temperature and having a molecular weight of 300 or more, and prepared so as to satisfy the formula illustrated in this patent.

SUMMARY OF THE INVENTION

While the known ink compositions and processes may be suitable for their intended purposes, a need remains for acoustic semi-solid hot melt ink compositions suitable for thermal ink jet printing. In addition, there is a need for semi-solid hot melt ink compositions which are compatible with a wide variety of plain papers and yield photographic quality images on coated papers. Further, there is a need for semi-solid hot melt ink compositions which generate high quality, lightfast, and waterfast images on plain papers. There is also a need for semi-solid hot melt ink jet ink compositions which generate high quality, fast-drying images on a wide variety of plain papers at low cost with high quality text and high quality graphics, and wherein the dye is retained on the paper surface while the ink vehicle can continue to spread within the paper structure. Further, there is a need for semi-solid semi-solid hot melt ink jet ink compositions which exhibit minimal feathering. Additionally, there is a need for semi-solid hot melt ink jet ink compositions which exhibit minimal intercolor bleed. There is also a need for semi-solid hot melt ink jet ink compositions which possess excellent image permanence. Further, there is a need for semi-solid semi-solid hot melt ink jet ink compositions which are suitable for use in acoustic ink jet printing processes. Additionally, there is a need for semi-solid hot ink compositions suitable for ink jet printing processes wherein the substrate is heated prior to printing and is cooled to ambient temperature subsequent to printing (heat and delay printing processes). There is also a need for ink compositions suitable for ink jet printing wherein high optical densities can be achieved with relatively low dye concentrations. A need also remains for ink compositions suitable for ink jet printing wherein curling of the substrate, such as paper, subsequent to printing is minimized, or avoided. These and other needs can be achievable with the inks of the present invention in embodiments thereof.

DETAILED DESCRIPTION OF THE INVENTION

The invention of the present application in embodiments relates to an ink composition comprised of (1) a liquid cyclic vehicle (2) a cyclic, preferably solid cyclic compound, (3) a liquid crystalline nitrite compound, (4) a lightfastness UV absorber, (5) a lightfastness antioxidant, and (6) a colorant.

In embodiments the ink compositions of the present invention comprise a colorant, such as a dye, and a cyclic liquid vehicle with for example, an acoustic-loss value of from about 5 to about 40 dB/mm and a boiling point of for example, greater than, or equal to about 150° C. and lower than about 350° C., and preferably between about 170 to about 300° C., and with low acoustic loss values of for example, below, or equal to about 60 dB/mm, and preferably in the range of between about 5 to about 40 dB/mm, (2) a non-aqueous solid, preferably cyclic additive with for example, a melting point of lower than, or equal to about 75° C. and preferably between about 30 to about 74° C., with a low acoustic loss value, and which acoustic loss is for example, below about, or equal to about 100 dB/mm, and preferably in the range of between about 25 to about 80 dB/mm, (3) a liquid crystalline nitrile compound, (4) a UV absorber, and (5) an antioxidant, each present in various suitable amounts.

In embodiments, the inks possess a viscosity of from, for example, about 1 to about 20, and preferably from 1 to about 10 centipoise.

The present invention relates to a substantially nonaqueous ink composition comprised of (1) a liquid cyclic vehicle with an acoustic-loss value of from about 5 to about 40 dB/mm, (2) a solid additive component with a melting point of from about 30 to about 74° C. and an acoustic-loss value of from about 25 to about 80 dB/mm, (3) a liquid crystalline nitrile compound, (4) a lightfastness UV absorber, (5) a lightfastness antioxidant, and (6) a colorant, and which ink possesses an acoustic-loss value of from about 10 to about 80 dB/mm; a nonaqueous ink composition wherein the cyclic vehicle is present in an amount of from about 0.5 to about 49 percent by weight, the solid additive component with a melting point of from about 30 to about 74° C. is present in an amount of from about 0.5 to about 49 percent by weight, the liquid crystalline nitrile compound is present in an amount of from about 69 to about 1 percent by weight, the UV absorber is present in an amount of from about 5 to about 0.25 percent by weight, the antioxidant is present in an amount of from about 5 to about 0.25 percent by weight, and the colorant is present in an amount of from about 20 to about 0.5 percent by weight; a nonaqueous ink composition wherein the liquid cyclic vehicle is selected from the group consisting of cyclic compounds of (1) 1,2,2,6,6-pentamethyl piperidine, (2) indan, (3) indene, (4) 4-(2-aminoethyl) morpholine (5) 1-(3-aminopropyl)-2-pyrrolidone, (6) ethylβ-oxo-3-furanpropionate, (7) tetrahydrofurfuryl alcohol, (8) methyl 2-furoate, (9) 2-methoxy-5-methylpyrazine (10) 4,8-bis(hydroxymethyl)tricyclo [5.2.1.0$^{2.6}$] decane, and (11) 01-acetyl-2-methyl-1-cyclopentene; a nonaqueous ink composition wherein the liquid cyclic vehicle is selected from the group consisting of anhydrides of (1) butyric anhydride, (2) valeric anhydride (3) hexanoic anhydride, (4) heptanoicanhydride, (5) decanoicanhydride, (6) dodecenyl succinic anhydride, (7) bromomaleicanhydride, (8) citraconic anhydride, (9) 4-methyl-1,2-cyclohexane dicarboxylic anhdride, and (10) methyl-5-norbornene-2,3-dicarboxylic anhydride; a nonaqueous ink composition wherein the solid additive (2) is a heterocyclic compound selected from the group consisting of (1) 5-(hydroxymethyl)furfural, (2) 1,2-bis(4,4-dimethyl-2-oxazolin-2-yl)ethane, (3) dimethyl-3,4-furane dicarboxylate, (4) methyl 2,5-dihydro-2,5-dimethoxy-2-furan carboxylate, (5) tert-butyl-4-benzyl-1-piperazinecarboxylate, (6) (S)-(−)-5-(hydroxy methyl)-2 (5H)furanone, (7) 2,4,8,10-tetra oxa spiro [5.5]undecane, (8) 3,9-divinyl-2,4,8,10-tetra oxaspiro [5,5]undecane, (9) indole, and (10) 2-(4-pentylphenyl)-5-(4-pentyloxyphenyl) pyrimidine; a nonaqueous ink composition wherein the additive (2) with a melting point of from about 30 to about 74° C. is selected from the group consisting of (1) 2,2-dimethyl succinic anhydride, (2) 2-dodecen-1-yl succinic anhydride, (3) cis-1,2-cyclohexane dicarboxylic anhydride, (4) 2,2-dimethyl glutaric anhydride, (5) 1-cyclopentene-1, 2-dicarboxylic anhydride, (6) myristic anhydride, (7) glutaric anhydride, (8) (S)-(−)-2-acetoxysuccinic anhydride, (9) 3,3-tetramethylene glutaric anhydride, and (10)stearic anhydride; a nonaqueous ink composition wherein the nitrile liquid crystalline compound is selected from the group consisting of (1) 4-(trans-4-pentyl cyclohexyl) benzo nitrile, (2) 4'-pentyl-4'-biphenylcarbonitrile, (3) 4'-(pentyloxy)-4-biphenyl carbonitrile, (4) 4'-hexyl-4-biphenylcarbonitrile, (5) 4'-(hexyloxy)-4-biphenylcarbonitrile, (6) 4'-heptyl-4-biphenylcarbonitrile, (7) 4'-heptyloxy-4-biphenyl carbonitrile, (8) 4'-octyl-4-biphenylcarbonitrile, (9) 4'-(octyloxy)-4-biphenyl carbonitrile, and (10) 1-isothio cyanato-4-(trans-4-propylcyclohexyl)benzene; an ink wherein the lightfast UV absorber compound is selected from the group consisting of (1) N-p-ethoxycarbonyl phenyl)-N'-ethyl-N'-phenyl formadine, (2) 1,1-(1,2-ethanediyl) bis(3,3,5,5-tetramethyl piperazinone), (3) 6-ethoxy-1, 2-dihydro-2,2,4-trimethyl quinoline, (4) 2-(4-benzoyl-3-hydroxyphenoxy)ethyl acrylate, (5) 2-dodecyl-N-(2,2,6,6-tetramethyl-4-piperidinyl)succinimide, (6) 2-dodecyl-N-(1, 2,2,6,6-penta methyl-4-piperidinyl)succinimide, (7) N-(1-acetyl-2,2,6,6-tetramethyl-4-piperidinyl)-2-dodecyl succinimide, (8) [2,2,6,6-tetramethyl-4 -piperidinyl/β,β,β', β'-tetramethyl-3,9-(2,4,8,10-tetraoxospiro(5,5)undecane) diethyl]-1,2,3,4-butanetetracarboxylate, (9) [1,2,2,6,6-pentamethyl-4-piperidinyl/β,β,β',β"-tetramethyl-3,9-(2,4,8, 10-tetraoxo spiro (5,5) undecane)diethyl]-1,2,3,4-butane tetracarboxylate, and (10) [2,2,6,6-tetramethyl-4-piperidinyl)-1,2,3,4-butanetetra carboxylate; a nonaqueous ink wherein the lightfastness antioxidant is selected from the group consisting of (1) antimony dialkyl phosphorodithioate, (2) molybdenum oxysulfide dithio carbamate, (3) nickel-bis(o-ethyl(3,5-di-tert-butyl-4-hydroxybenzyl)phosphonate, and (4) tetra sodium N-(1,2-dicarboxyethyl)-N-octadecyl sulfosuccinamate; a nonaqueous ink further containing ink additives; a printing process which comprises incorporating into an acoustic ink jet printer the ink illustrated herein, and causing droplets of the ink to be ejected in imagewise pattern onto a substrate; a process which comprises (a) providing an acoustic ink printer having a pool of the liquid ink illustrated herein with a free surface, and a printhead including at least one droplet ejector for radiating the free surface of said ink with focused acoustic radiation to eject individual droplets of ink therefrom on demand, said radiation being brought to focus with a finite waist diameter in a focal plane, and causing droplets of the ink to be ejected in imagewise pattern onto a substrate; an ink wherein the colorant is selected in an amount of from about 0.5 to about 20 percent by weight; an ink wherein the colorant is a pigment, or a dye; an ink wherein the colorant is a pigment of carbon black; an ink wherein the colorant is a dye of cyan, magneta, yellow, black, or mixtures thereof; an ink wherein (1) the cyclic vehicle is 1-acetyl-2-methyl-1-cyclopentene, 1,2,2,6,6-pentamethylpiperidine, or butyric anhydride, (2) the additive is 2,4,8,10-tetra oxa spiro[5.5] undecane, or 1,2-bis(4,4-dimethyl-2-oxazolin-2-yl)ethane stearic anhydride, (3) the liquid crystalline nitrile compound is 4'-(pentyloxy)-4-biphenylcarbonitrile, or 4'-(pentyloxy)-4-biphenylcarbonitrile, (4) the UV absorber is 2-dodecyl-N-(2,2,6,6-tetramethyl-4-piperidinyl) succinimide, or [1,2,2,6, 6-pentamethyl-4-piperidinyl/β,β,β',β'tetramethyl-3,9-(2,4,8, 10-tetraoxo spiro (5,5) undecane)diethyl]-1,2,3,4-butane tetracarboxylate, (5) the lightfastness antioxidant is tetra-sodium-N-(1,2-dicarboxyethyl)-N-octadecyl-sulfosuccinamate), or molybdenum oxysulfide dithio carbamate; an ink with a viscosity of from about 1 centipoise to about 10 centipoise at a temperature of from about 125° C. to about 165° C.; an ink composition comprised of (1) a liquid cyclic vehicle (2) a cyclic compound, (3) a liquid crystalline nitrile compound, (4) a lightfastness UV absorber, (5) a lightfastness antioxidant, and (6) a colorant; an ink wherein the colorant is a pigment; an wherein the colorant is a dye; an ink with an acoustic-loss value of from about 5 to about 40 dB/mm for said cyclic liquid vehicle, (2) a solid additive cyclic component with a melting point of from about 30 to about 74° C. and an acoustic-loss value of from about 25 to about 80 dB/mm, and which ink possesses an acoustic-loss value of from about 10 to about 80 dB/mm, and which ink possesses a viscosity of from about 1 centipoise to about 10 centipoise at a temperature of from about 125° C. to about 165° C.; and an ink wherein the additive (2) is a cyclic solid compound.

The liquid cyclic vehicle with an acoustic-loss value of for example, from about 5 to about 80, preferably to about 40 dB/mm is present in the ink composition in an amount of for example, from about 0.5 to about 49 percent by weight, the solid cyclic compound with for example, a melting point of from about 30 to about 74° C. is present for example, in an amount of from about 0.5 to about 49 percent by weight, the nitrile liquid crystalline compound is present for example, in an amount of from about 69 to about 1 percent by weight, the UV absorber is present for example, in an amount of from about 5 to about 0.25 percent by weight, the antioxidant is for example, present in an amount of from about 5 to about 0.25 percent by weight, and the colorant is for example, present in an amount of from about 20 to about 0.5 percent by weight, and wherein the total of all ink components is about 100 percent, or about 100 parts.

The ink composition contains for example the following range amounts in the sequence (1), (2), (3), (4), (5), and (6) colorant: [0.5+0.5+69+5+5+20=100] to [49+49+1+0.25+0.25+0.5=100].

In preferred embodiments the liquid cyclic vehicle with an acoustic-loss value of from about 5 to about 40 dB/mm is present in an amount of from about 5 to about 45 percent by weight, the solid additive cyclic compound having a melting point of for example, from about 30 to about 74° C. is present in an amount of from about 5 to about 45 percent by weight, the liquid crystalline nitrile compound is present in an amount of from about 65 to about 7 percent by weight, the UV absorber is present in an amount of from about 5 to about 1 percent by weight, the antioxidant is present in an amount of from about 5 to about 1 percent by weight, and the colorant is present in an amount of from about 15 to about 1 percent by weight. The ink composition contains the following preferred range amounts in the aforementioned sequence: [5+5+65+5+5+15=100] to [45+45+7+1+1+1=100]. These composition ranges, and the others indicated herein were established using a number of known techniques, such as a statistical design based on the analyses of the experimental data of viscosity at 150° C., jettability at 150° C., image quality, lightfastness, and waterfastness characteristics of various ink compositions.

Embodiments of the present invention include an ink composition comprised of a liquid cyclic vehicle with an acoustic-loss value of from about 5 to about 40 dB/mm and which cyclic vehicle is selected from liquid heterocyclics including for example (1) 1-octyl-2-pyrrolidinone, (2) 1-dodecyl-2-pyrrolidinone, (3) 4,4'-trimethylene bis(1-methyl piperidine)piperidine, (4) 4-amino-2,2,6,6-tetramethyl piperidine, (5) 1,2,2,6,6-pentamethyl piperidine, (6) 1-acetyl-3-methyl piperidine, (7) 5-methylfurfural, (8) 2-methylbenzofuran, (9) 2-acetyl thiophene, (10) 3-acetyl pyridine, (11) 4-acetyl pyridine, (12) 1-acetyl-4-piperidone (13) indan, (14) indene, (15) 4-(2-aminoethyl)morpholine, (16) 1-(2-amino ethyl)piperazine, (17) 4-(3-aminopropyl) morpholine, (18) 1-(2-amino ethyl) piperidine, (19) 4-(aminomethyl)piperidine, (20) 2-acetyl-1-methylpyrrole, (21) 3-acetyl-1-methylpyrrole, (22) 1-acetylindole, (23) 5-acetyl-2,4-dimethylthiazole, (24) 1-(3-aminopropyl)-2-pyrrolidone, (25) benzylpyridine, (26) 5-methoxy indan, (27) ethyl-β-oxo-3-furanpropionate, (28) 2-furaldehydediethylacetal, (29) furfuryl acetate, (30) 2,5-dimethoxy-2,5-dihydrofuran, (31) 2-acetyl-5-methylfuran, (32) diethyl-3,4-furan dicarboxylate, (33) 2,3-dihydrobenzofuran, (34) 3-hydroxy tetrahydrofuran, (35) (±)-2-ethyoxy-tetrahydrofuran, (36) 2,5-diethoxytetrahydro furan, (37) tetrahydrofurfuryl alcohol, (38) methyl 2-furoate, (39) 2-acetyl pyridine, (40) 4-acetylmorpholine, (41) 2-methoxy-5-methylpyrazine, (42) 2,5-dimethyl pyrazine, (43) and 4,8-bis(hydroxymethyl)tricyclo[5.2.1.0$^{2.6}$]decane (44) 4-methoxy benzylidene-4'-n-butylaniline, all available from Aldrich chemicals.

Embodiments of the present invention include an ink composition comprised of a liquid cyclic vehicle with for example an acoustic-loss value of less than about 50, and preferably less thna about 40 dB/mm and which vehicle includes liquid cyclic anhydride compounds of (1) butyricanhydride, (2) valeric anhydride, (3) hexanoic anhydride, (4) heptanoic anhydride, (5) decanoicanhydride, (6) dodecenyl succinic anhydride, (7) bromo maleic anhydride, (8) citraconic anhydride, (9) 4-methyl-1,2-cyclohexane dicarboxylic anhdride, and (10) methyl-5-norbornene-2,3-dicarboxylic anhydride, all available from Aldrich chemicals.

The compounds (2) preferably with melting points of for example, between about 30 to about of 74° C. and preferably an acoustic-loss value of between 25 to about 80 dB/mm include (1) 1-acetyl piperazine, (2) 5-(hydroxy methyl) furfural, (3) 3-acetyl-2,5-dimethylthiophene, (4) ethyl-2-furoate, (5) 3-amino pyrazole, (6) 2-methoxydibenzofuran, (7) 3-amino-5-methylpyrazole, (8) 2-amino-4-methylthiazole, (9) 5-amino-1-ethylpyrazole, (10) 5-acetoxymethyl-2-furaldehyde, (11) 4-acetyl-2,4-dihydro-5-methyl-2-phenyl-3H-pyrazol-3-one monohydrate, (12) 2-acetyl-5-chlorothiophene, (13) 1,2-bis(4,4-dimethyl-2-oxazolin-2-yl)ethane, (14) aminopyridine, (15) 4,4'-trimethylene dipyridine, (16) 2-amino-4,6-dimethyl pyridine, (17) 3-acetyl thiophene, (18) 4,4'-trimethylene dipiperidine, (19) 5-indanol, (20) 2-indanol, (21) 1-indanol, (22) 3-amino-5-methylisoxazole, (23) 2-amino-4-phenyl-5-tetra decyl-thiazole, (24) dimethyl3,4-furandicarboxylate, (25) methyl2,5-dihydro-2,5-dimethoxy-2-furancarboxylate, (26) tert-butyl-4-benzyl-1-piperazinecarboxylate, (27) 5-(hydroxymethyl)-2(5H)furanone, (28) 2-coumaranone, (29) 3-acetyl-2-oxa zolidinone, (30) 1-indanone, (31) 2-indanone, (32) ε-caprolactam, (33) L-α-amino-ε-caprolactam, (34) N-methylsuccinimide, (35) 2,4,8,10-tetraoxaspiro[5.5]undecane, (36) 3,9-divinyl-2,4,8,10-tetraoxaspiro[5,5]undecane, (37) indole, (38) and 2-(4-pentyl phenyl)-5-(4-pentyloxyphenyl)pyrimidine, all availablefrom Aldrich chemicals.

The additive compounds (2) with a melting point of for example, between about 30 to about of 74° C. and preferably an acoustic-loss value of between 25 to about 80 dB/mm also include (1) 2,2-dimethyl succinic anhydride, (2) methyl succinic anhydride, (3) 2-dodecen-1-yl succinic anhydride, (4) is-1,2-cyclohexane dicarboxylic anhydride, (5) lauric anhydride, (6) 2,2-dimethyl glutaric anhydride, (7) benzoic anhydride, (8) 3-methyl glutaric anhydride, (9) 1-cyclopentene-1,2-dicarboxylicanhydride, (10) myristicanhydride, (11) maleic anhydride, (12) glutaricanhydride, (13) (S)-(−)-2-acetoxysuccinicanhydride, (14) palmitic anhydride, (15) 3,3-tetramethylene glutaric anhydride, (16) 2 methylene succinic anhydride, and (17) stearic anhydride, all available from Aldrich chemicals.

The nitrile functionality containing liquid crystalline components, or liquid crystalline compounds (3) of the inks are for example, selected from the group consisting of (a) nitrile functional materials such as (1) 4-(trans-4-pentylcyclohexyl)benzonitrile, (2) 4'-pentyl-4'-biphenyl carbonitrile, (3) 4'-(pentyloxy)-4-biphenylcarbonitrile, (4)

4'-hexyl-4-biphenyl carbonitrile, (5) 4'-(hexyloxy)-4-biphenylcarbonitrile, (6) 4'-heptyl-4-biphenyl carbonitrile, (7) 4'-heptyl oxy-4-biphenyl carbonitrile, (8) 4'-octyl-4-biphenyl carbonitrile, (9) 4'-(octyloxy)-4-biphenylcarbonitrile, (b) isonitrile compounds (1) 1-isothiocyanato-4-(trans-4-propyl cyclohexyl)benzene, (2) 1-(trans-4-hexylcyclohexyl)-4-isothiocyanato benzene, (3) 1-isothiocyanato-4-(trans-4-octylcyclohexyl) benzene, and (4) 1-hexyl-4-(4-isothio cyanato phenyl) bicyclo[2.2.2] octane, all available from Aldrich chemicals.

The lightfast UV absorbers include (1) N-p-ethoxycarbonylphenyl)-N'-ethyl-N'-phenylformadine, Givaudan Corporation, (2) 1,1-(1,2-ethanediyl)bis(3,3,5,5-tetramethyl piperazinone), Goodrich chemicals, (3) 2,2,4-trimethyl-1,2-hydroquinoline, Mobay Corporation, (4) 6-ethoxy-1,2-dihydro-2,2,4-trimethylquinoline, Monsanto Chemicals, (5) 2,4,6-tris-(N-1,4-dimethylpentyl-4-phenylenediamino)-1,3,5-triazine, Uniroyal Corporation; (6) 2-(4-benzoyl-3-hydroxyphenoxy)ethylacrylate, (7) 2-dodecyl-N-(2,2,6,6-tetra methyl-4-piperidinyl) succinimide, (8) 2-dodecyl-N-(1,2,2,6,6-pentamethyl-4-piperidinyl)succinimide, (9) N-(1-acetyl-2,2,6,6-tetramethyl-4-piperidinyl)-2-dodecyl succinimide, all four available from Aldrich Chemicals; (10) 2,2,6,6-tetramethyl-4-piperidinyl/βββ'β',-tetramethyl-3,9-(2,4,8,10-tetraoxospiro(5,5)-undecane) diethyl]-1,2,3,4-butane tetracarboxylate, (11) [1,2,2,6,6-pentamethyl-4-piperidinyl/β,ββ'β'-tetramethyl-3,9-(2,4,8,10-tetraoxo-spiro-(5,5) undecane)diethyl]-1,2,3,4-butanetetra carboxylate, (12) [2,2,6,6-tetramethyl-4-piperidinyl)-1,2,3,4-butane tetracarboxylate, all three available from Fairmount Corporation, and (13) nickel dibutyl dithio carbamate, available as UV-Chek AM-105, from Ferro Corporation.

The lightfast antioxidants include for example: (1) antimonydialkylphosphorodithioate, (2) molybdenumoxysulfidedithio carbamate, both available from Vanderbilt Corporation, (3) (nickel-bis(o-ethyl(3,5-di-tert-butyl-4-hydroxybenzyl) phosphonate, Ciba Geigy Corporation, (4) tetra sodium-N-(1,2-dicarboxyethyl)-N-octadecyl sulfosuccinamate, American Cyanamid Corporation.

Suitable colorants, present in an effective amount generally of from about 1 to about 20, or preferably for example, from 2 to about 10 percent by weight, include pigments and dyes, with solvent dyes being preferred. Any dye or pigment may be chosen, provided that it is capable of being dispersed or dissolved in the vehicle and is compatible with the other ink components. Colorant includes pigments, dyes, mixtures thereof, mixtures of dyes, mixtures of pigments, and the like.

Examples of suitable colorants include pigments such as Violet Toner VT-8015 (Paul Uhlich), Paliogen Violet 5100 (BASF), Paliogen Violet 5890 (BASF), Permanent Violet VT 2645 (Paul Uhlich), Heliogen Green L8730 (BASF), Argyle Green XP-111-S (Paul Uhlich), Brilliant Green Toner GR 0991 (Paul Uhlich), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), Heliogen Blue L6900, L7020 (BASF), Heliogen Blue K6902, K6910 (BASF), Heliogen Blue D6840, D7080 (BASF), Sudan Blue OS (BASF), Neopen Blue FF4012 (BASF), PV Fast Blue B2G01 (American Hoechst), Irgalite Blue BCA (Ciba-Geigy), Paliogen Blue 6470 (BASF), Sudan II((Red Orange), (Matheson, Colemen Bell), Sudan I((Orange), (Matheson, Colemen Bell), Sudan Orange G (Aldrich), Sudan Orange 220 (BASF), Paliogen Orange 3040 (BASF), Ortho Orange OR 2673 (Paul Uhlich), Paliogen Yellow 152,1560 (BASF), Lithol Fast Yellow 0991K (BASF), Paliotol Yellow 1840 (BASF), Novoperm Yellow FGL (Hoechst), Permanent Yellow YE 0305 (Paul Uhlich), Lumogen Yellow D0790 (BASF), Suco-Yellow L1250 (BASF), Suco-Yellow D1355 (BASF), Suco Fast Yellow D1355, D1351 (BASF), Hostaperm Pink E (American Hoechst), Fanal Pink D4830 (BASF), Cinquasia Magenta (Du Pont), Paliogen Black L0084 (BASF), Pigment Black K801 (BASF), and carbon blacks such as Regal 330® (Cabot), Carbon Black 5250, and Carbon Black 5750 (Columbia Chemical Company).

Examples of suitable dyes include Pontamine; Food Black 2; Carodirect Turquoise FBL Supra Conc.(Direct Blue 199), available from Carolina Color and Chemical; Special Fast Turquoise 8 GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E6-BA, available from Mobay Chemical; Procion Red H8B (Reactive Red 31), available from ICI America; Pylam Certified D&C Red #28 (Acid Red 92), available from Pylam; Direct Brill Pink B Ground Crude, available from Crompton and Knowles; Cartasol Yellow GTF Presscake, available from Sandoz, Inc.; Tartrazine Extra Conc. (FD&C Yellow #5, Acid Yellow 23), available from Sandoz, Inc.; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon; Basacid Black X 34, available from BASF; Carta Black 2GT, available from Sandoz, Inc.; and the like. Particularly preferred are solvent dyes, and within the class of solvent dyes, spirit soluble dyes are preferred because of their compatibility with the vehicles and dye leveling agents of the present application. Examples of suitable spirit solvent dyes include Neozapon Red 492 (BASF), Orasol Red G (Ciba-Geigy), Direct Brilliant Pink B (Crompton - Knolls), Aizen Spilon Red C- BH (Hodagaya Chemical Company), Kayanol Red 3BL (Nippon Kayaku Company). Levanol Brilliant Red 3BW (Mobay Chemical Company), Levaderm Lemon Yellow (Mobay Chemical Company), Spirit Fast Yellow 3G, Aizen Spilon Yellow C-GNH (Hodagaya Chemical Company), Sirius Supra Yellow GD 167, Cartasol Brilliant Yellow 4GF (Sandoz), Pergasol Yellow CGP (Ciba-Geigy), Orasol Black RLP(Ciba-Geigy), Savinyl Black RLS (Sandoz), Dermacarbon 2GT (Sandoz), Pyrazol Black BG (ICI), Morfast Black Conc.A (Morton-Thiokol), Diaazol Black RN Quad (ICI), Orasol Blue GN (Ciba-Geigy), Savinyl Blue GLS (Sandoz), Luxol Blue MBSN (Morton-Thiokol), Sevron Blue 5GMF (ICI), Basacid Blue 750 (BASF), and the like.

The nonaqueous ink composition may also contain additives such as biocides, humectants, and the like.

Optional ink additives more specifically include biocides such as Dowicil 150, 200, and 75, benzoate salts, sorbate salts, and the like, present in effective amounts, such as for example an amount of from about 0.0001 to about 4 percent by weight, and preferably from about 0.01 to about 2.0 percent by weight; pH controlling agents such as acids; or bases, phosphate salts, carboxylates salts, sulfite salts, amine salts, and the like, present, for example, in an amount of from 0 to about 1 percent by weight and preferably from about 0.01 to about 1 percent by weight, based on the weight of the ink components.

The examples of ink components recited herein represent examples, thus other suitable components not specifically recited may also be selected in embodiments of the present invention.

The inks of the present invention can be prepared by any suitable method. A colored semi-solid hot melt ink composition was prepared by mixing 30 percent by weight of a cyclic liquid vehicle having an acoustic-loss value of less than about 40 dB/mm and a boiling point of greater than about 150° C., 35 percent by weight of the solid additive, such as a cyclic additive with a melting point of lower than 75° C. and an acoustic-loss value of less than about 60 dB/mm, 20 percent by weight of a liquid crystalline nitrile compound, 5 percent by weight of a lighfast UV absorber, 5 percent by weight of lightfast antioxidant and 5 percent by weight of a colorant. The mixture can then be heated to a temperature of about 100° C. and stirred for a period of about 60 minutes until it forms a homogeneous solution, and subsequently was cooled to 25° C.

The inks of the present invention are particularly suitable for printing processes wherein the substrate, such as paper, transparency material, or the like, is heated during the printing process to facilitate formation of the liquid crystalline phase within the ink. When transparency substrates are selected, temperatures typically are limited to a maximum of about 100° C. to about 110° C., since the polyester typically employed as the base sheet tends to deform at higher temperatures. Specially formulated transparencies and paper substrates can, however, tolerate higher temperatures, and frequently are suitable for exposure to temperatures of 150° C. or even 200° C. in some instances. Typical heating temperatures are from about 40° C. to about 140° C., and preferably from about 60° C. to about 95° C., although the temperature can be outside these ranges.

The inks of the present invention are also suitable for use in acoustic ink printing processes. In acoustic ink jet printing, reference a number of the copending applications and patents recited here, the disclosures of which have been totally incorporated herein by reference, an acoustic beam exerts a radiation pressure against objects upon which it impinges. Thus, when an acoustic beam impinges on a free surface of the ink of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power, reference, for example, IBM Technical Disclosure Bulletin, Vol. 16, No. 4, September 1973, pages 1168 to 1170, the disclosure of which is totally incorporated herein by reference. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is accomplished by independently modulating the excitation of the acoustic radiators in accordance with the input data samples for the image that is to be printed. This modulation enables the radiation pressure, which each of the beams exerts against the free ink surface, to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive primarily because it does not require the nozzles or the small ejection orifices which have caused many of the reliability and pixel placement accuracy problems that conventional drop on demand and continuous stream ink jet printers have suffered.

Pixel placement accuracy problems that conventional drop on demand and continuous stream ink jet printers have suffered. The size of the ejection orifice is a critical design parameter of an ink jet because it determines the size of the droplets of ink that the jet ejects. As a result, the size of the ejection orifice cannot be increased without sacrificing resolution. Acoustic printing has increased intrinsic reliability since usually there are no nozzles to clog. Furthermore, small ejection orifices are avoided, so acoustic printing can be performed with a greater variety of inks than conventional ink jet printing, including inks having higher viscosities and inks containing pigments and other particulate components. Acoustic ink printers embodying printheads comprising acoustically illuminated spherical focusing lenses can print precisely positioned pixels (picture elements) at resolutions which are sufficient for high quality printing of relatively complex images. It has also been determined that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of pagewidth ejector arrays, ranging from (i) single row, sparse arrays for hybrid forms of parallel/serial printing to (ii) multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), however in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in *J. Appl. Phys.*, vol. 65, no. 9 (May 1, 1989) and references therein, the disclosure of which is totally incorporated herein by reference.

Acoustic-loss Measurements recited herein were measured as follows: samples of various cyclic liquid vehicles and cyclic solid surface leveling compounds were placed between two transducers with the temperature set at 150° C. The samples were allowed to equilibrate at 150° C. for five minutes. The two transducers were brought together to maximize the acoustic signal. The amplitude and the position of the signals were recorded. The two transducers were then separated by a distance varying from 25.4 microns to 125.4 microns recording each time the amplitude and the position of the signal. Each measurement was performed three times and three samples of the same material were measured. The attenuation dB/mm was then calculated by ratioing the amplitude values obtained at different separation distances. The liquid cyclic compounds had dB/mm values of for example, from about 15 to 40, and the solid cyclic compounds had dB/mm values of from about 35 to about 65. A value of less than 80 dB/mm for the ink composition is of importance with respect to acoustic jetting processes.

The optical density measurements recited herein were obtained on a Pacificpectrograph Color System. The system consists of two major components, an optical sensor and a data terminal. The optical sensor employs a 6 inch integrating sphere to provide diffuse illumination and 8 degrees viewing. This sensor can be used to measure both transmission and reflectance samples. When reflectance samples are measured, a specular component may be included. A high resolution, full dispersion, grating monochromator was used to scan the spectrum from 380 to 720 nanometers. The data terminal features a 12 inch CRT display, numerical keyboard for selection of operating parameters and the entry of tristimulus values, and an alphanumeric keyboard for entry of product standard information The lightfast values of the ink jet images were measured in the Mark V Lightfast Tester obtained from Microscal Company, London, England.

The waterfast values of the ink jet images were obtained from the optical density data recorded before and after washing with hot [50° C.] water for two minutes.

Specific embodiments of the invention will now be described in detail. These examples are intended to be illustrative, and the invention is not limited to the materials, conditions, or process parameters set forth in these embodiments. All parts and percentages are by weight unless otherwise indicated. Temperatures are in degrees Centigrade.

EXAMPLE 1

A black semi-solid hot melt ink composition was prepared by mixing 30 percent by weight of the liquid cyclic vehicle 1-acetyl-2-methyl-1-cyclopentene, (Aldrich #28,268-5), with an acoustic-loss value of 20 dB/mm and a boiling point of 190° C., 35 percent by weight of the cyclic solid additive 2,4,8,10-tetra oxa Spiro [5.5]undecane, (Aldrich #22,061-2), with a melting point of 53° C. and an acoustic-loss value of 35 dB/mm, 20 percent by weight of the nitrile liquid crystalline compound 4'-(pentyloxy)-4-biphenyl carbonitrile, (Aldrich #32,852-9), 5 percent by weight of the UV absorber 2-dodecyl-N-(2,2,6,6-tetramethyl-4-piperidinyl) succinimide, (Aldrich #41,317-8), 5 percent by weight of an antioxidant tetra sodium-N-(1,2-dicarboxyethyl)-N-octadecyl sulfosuccinamate, Aerosol 22N, American Cyanamid Corporation, and 5 percent by weight of the colorant Orasol Black RLP (Ciba-Geigy). The resulting mixture was heated to a temperature of about 100° C. and stirred for a period of about 60 minutes until it formed a homogeneous solution, and subsequently was cooled to 25° C. The resulting black ink had an acoustic loss value of 39 dB/mm and a viscosity of 5.1 cps at 150° C.

EXAMPLE 2

A blue semi-solid hot melt ink composition was prepared by mixing 30 percent by weight of the liquid cyclic vehicle 1-acetyl-2-methyl-1-cyclopentene, (Aldrich #28,268-5), with an acoustic-loss value of 20 dB/mm and a boiling point of 190° C., 35 percent by weight of the solid paper additive 2,4,8,10-tetra oxa spiro [5.5]undecane, (Aldrich #22,061-2), with a melting point of 53° C. and an acoustic-loss value of 35 dB/mm, 20 percent by weight of the nitrile liquid crystalline compound 4'-(pentyloxy)-4-biphenylcarbonitrile, (Aldrich #32,852-9), 5 percent by weight of the UV absorber 2-dodecyl-N-(2,2,6,6-tetramethyl-4-piperidinyl) succinimide, (Aldrich #41,317-8), 5 percent by weight of the antioxidant tetra sodium-N-(1,2-dicarboxyethyl)-N-octadecyl sulfosuccinamate, Aerosol 22N, American Cyanamid Corporation, and 5 percent by weight of the colorant Sudan Blue dye (BASF). The resulting mixture was heated to a temperature of about 100° C. and then stirred for a period of about 60 minute until it formed a homogeneous solution, and subsequently the solution was cooled to 25° C. The resulting blue ink had an acoustic loss value of 39 dB/mm and a viscosity of 5.15 cps at 150° C.

EXAMPLE 3

A yellow semi-solid hot melt ink composition was prepared by mixing 30 percent by weight of the liquid cyclic vehicle 1-acetyl-2-methyl-1-cyclopentene, (Aldrich #28, 268-5), with an acoustic-loss value of 20 dB/mm and a boiling point of 190° C., 35 percent by weight of the solid cyclic (2) additive 2,4,8,10-tetra oxa spiro [5.5]undecane, (Aldrich #22,061-2), with a melting point of 53° C. and an acoustic-loss value of 35 dB/mm, 20 percent by weight of the nitrile liquid crystalline compound 4'-(pentyloxy)-4-biphenylcarbonitrile, (Aldrich #32,852-9), 5 percent by weight of the UV absorber 2-dodecyl-N-(2,2,6,6-tetramethyl-4-piperidinyl) succinimide, (Aldrich #41,317-8), 5 percent by weight of the antioxidant tetrasodium-N-(1,2-dicarboxyethyl)-N-octadecyl sulfosuccinamate, Aerosol 22N, American Cyanamid Corporation, and 5 percent by weight of the colorant Sudan yellow dye (BASF). The resulting mixture was heated to a temperature of about 100° C. and then stirred for a period of about 60 minutes until it formed a homogeneous solution, and subsequently the solution was cooled to 25° C. The resulting yellow ink had an acoustic loss value of 38 dB/mm and a viscosity of 5.05 cps at 150° C.

EXAMPLE 4

A red semi-solid hot melt ink composition was prepared by mixing 30 percent by weight of the liquid cyclic vehicle 1-acetyl-2-methyl-1-cyclopentene, (Aldrich #28,268-5), with an acoustic-loss value of 20 dB/mm and a boiling point of 190° C., 35 percent by weight of the solid additive 2,4,8,10-tetra oxa spiro [5.5]undecane, (Aldrich #22,061-2), with a melting point of 53° C. and an acoustic-loss value of 35 dB/mm, 20 percent by weight of the nitrile liquid crystalline compound 4'-(pentyloxy)-4-biphenyl carbonitrile, (Aldrich #32,852-9), 5 percent by weight of the UV absorber 2-dodecyl-N-(2,2,6,6-tetramethyl-4-piperidinyl) succinimide, (Aldrich #41,317-8), 5 percent by weight of the antioxidant tetrasodium-N-(1,2-dicarboxyethyl)-N-octadecyl sulfosuccinamate, Aerosol 22N, American Cyanamid Corporation, and 5 percent by weight of the colorant Sudan Red dye (BASF). The resulting mixture was heated to a temperature of about 100° C. (degrees Centigrade throughout) and then stirred for a period of about 60 minutes until it formed a homogeneous solution, and subsequently the solution was cooled to 25° C. The resulting yellow ink possessed an acoustic loss value of 38 dB/mm and a viscosity of 5.02 cps at 150° C.

Each of the above prepared four inks were incorporated into an acoustic ink jet printing test fixture utilizing the ejection mechanism disclosed in *J. Appl. Phys.* 65(9), May 1, 1989, and references therein, the disclosure of which are totally incorporated herein by reference. A jetting frequency of 160 MHz was used to generate drops of about 2 picoliters, up to 12 drops per pixel at 600 spi. The images formed exhibited excellent color quality with optical density values of 1.52 (Black), 1.54 (Cyan), 1.32 (Magenta), 0.95 (Yellow), and sharp edges, with lightfastness and waterfastness of greater than 98.5 percent, and more specifically from about 99 to about 99.7.

EXAMPLE 5

A black semi-solid hot melt ink composition was prepared by mixing 30 percent by weight of the liquid cyclic vehicle 1,2,2,6,6-pentamethyl piperidine, (Aldrich #27,463-1), with an acoustic-loss value of about 15 dB/mm and a boiling point of 188° C., 35 percent by weight of the solid additive 1,2-bis(4,4-dimethyl-2-oxazolin-2-yl)ethane, (Aldrich #24,309-4), with a melting point of 57° C. and an acoustic-loss value of 37 dB/mm, 20 percent by weight of the nitrile liquid crystalline compound 4-(trans-4-pentyl cyclohexyl) benzonitrile, (Aldrich #37,011-8), 5 percent by weight of the UV absorber [1,2,2,6,6-pentamethyl-4-piperidinyl/$\beta,\beta,\beta'$, $\beta'$,-tetramethyl-3,9-(2,4,8,10-tetraoxo spiro (5,5) undecane) diethyl]-1,2,3,4-butane tetracarboxylate, Mixxim HALS 63, Fairmount Corporation, 5 percent by weight of the antioxidant tetra sodium-N-(1,2-dicarboxyethyl)-N-octadecyl sulfosuccinamate, Aerosol 22N, American Cyanamid Corporation, and 5 percent by weight of the colorant Orasol Black RLP (Ciba-Geigy). The resulting mixture was heated to a temperature of about 100° C. and then stirred for a period of about 60 minutes until it formed a homogeneous solution, and subsequently the solution was cooled to 25° C. The resulting black ink had an acoustic loss value of 39 dB/mm and a viscosity of 5.1 cps at 150° C.

EXAMPLE 6

A blue semi-solid hot melt ink composition was prepared by mixing 30 percent by weight of the liquid cyclic vehicle butyric anhydride, (Aldrich#18,573-6), with an acoustic-loss value of 18 dB/mm and a boiling point of 205° C., 35 percent by weight of the solid additive stearic anhydride, (Aldrich #28,651-6), with a melting point of 72° C. and an acoustic-loss value of less than about 34 dB/mm, 20 percent by weight of the nitrile liquid crystalline compound 4'-(pentyloxy)-4-biphenylcarbonitrile, (Aldrich #32,852-9), 5 percent by weight of the UV absorber 2-dodecyl-N-(2,2,6,6-tetra methyl-4-piperidinyl) succinimide, (Aldrich #41,317-8), 5 percent by weight of the antioxidant tetrasodium-N-(1,2-dicarboxyethyl)-N-octadecyl sulfosuccinamate, Aerosol 22N, American Cyanamid Corporation, and 5 percent by weight of the colorant Sudan Blue dye (BASF). The resulting mixture was heated to a temperature of about 100° C. and then stirred for a period of about 60 minutes until it formed a homogeneous solution, and subsequently the solution was cooled to 25° C. The resulting blue ink possessed an acoustic loss value of 39 dB/mm and a viscosity of 5.05 cps at 150° C.

EXAMPLE 7

A yellow semi-solid hot melt ink composition was prepared by mixing 30 percent by weight of the liquid cyclic vehicle butyric anhydride, (Aldrich#18,573-6), with an acoustic-loss value of 18 dB/mm and a boiling point of 205° C., 35 percent by weight of the solid (2) noncyclic additive stearic anhydride, (Aldrich #28,651-6), with a melting point of 72° C. and an acoustic-loss value of less than about 34 dB/mm, 20 percent by weight of the nitrile liquid crystalline compound 4'-(pentyloxy)-4-biphenylcarbonitrile, (Aldrich #32,852-9), 5 percent by weight of the UV absorber 2-dodecyl-N-(2,2,6,6-tetramethyl-4-piperidinyl) succinimide, (Aldrich #41,317-8), 5 percent by weight of the antioxidant tetrasodium-N-(1,2-dicarboxyethyl)-N-octadecyl sulfosuccina mate, Aerosol 22N, American Cyanamid Corporation, and 5 percent by weight of the colorant Sudan yellow dye (BASF). The resulting mixture was heated to a temperature of about 100° C. and then stirred for a period of about 60 minutes until it formed a homogeneous solution, and subsequently the solution was cooled to 25° C. The resulting yellow ink had an acoustic loss value of 38 dB/mm and a viscosity of 5.05 cps at 150° C.

EXAMPLE 8

A red semi-solid hot melt ink composition was prepared by mixing 30 percent by weight of the liquid cyclic vehicle butyric anhydride, (Aldrich#18,573-6), with an acoustic-loss value of 18 dB/mm and a boiling point of 205° C., 35 percent by weight of the solid paper additive stearic anhydride, (Aldrich #28,651-6), with a melting point of 72° C. and an acoustic-loss value of less than about 34 dB/mm, 20 percent by weight of the nitrile liquid crystalline compound 4'-(pentyloxy)-4-biphenylcarbonitrile, (Aldrich #32, 852-9), the UV absorber 2-dodecyl-N-(2,2,6,6-tetramethyl-4-piperidinyl) succinimide, (Aldrich #41,317-8), 5 percent by weight of the antioxidant tetrasodium-N-(1,2-dicarboxyethyl)-N-octadecyl sulfosuccina mate, Aerosol 22N, American Cyanamid Corporation, and 5 percent by weight of the colorant Sudan Red dye (BASF). The resulting mixture was heated to a temperature of about 100° C. and then stirred for a period of about 60 minutes until it formed a homogeneous solution, and subsequently the solution was cooled to 25° C. The resulting yellow ink had an acoustic loss value of 38 dB/mm and a viscosity of 5.02 cps at 150° C.

Each of the above prepared four inks were incorporated into an acoustic ink jet printing test fixture utilizing the ejection mechanism disclosed in *J. Appl. Phys.* 65(9), May 1, 1989, and references therein, the disclosure of which are totally incorporated herein by reference. A jetting frequency of 160 MHz was used to generate drops of about 2 picoliters, up to 12 drops per pixel at 600 spi. The images formed exhibited excellent color quality with optical density values of 1.62 (Black), 1.61 (Cyan), 1.33 (Magenta), 0.92 (Yellow), sharp edges, with lightfastness and waterfastness of greater for each, than 97 percent, and more specifically from about 97.3 to about 97.7.

Other modifications of the present invention may occur to those of ordinary skill in the art subsequent to a review of the present application, and these modifications, including equivalents thereof, are intended to be included within the scope of the present invention.

What is claimed is:

1. An ink composition comprised of (1) a liquid cyclic vehicle (2) a cyclic compound, (3) a liquid crystalline nitrile compound, (4) a lightfastness UV absorber, (5) a lightfastness antioxidant, and (6) a colorant.

2. An ink in accordance with claim 1 wherein the colorant is a pigment.

3. An ink in accordance with claim 1 wherein the colorant is a dye.

4. An ink in accordance with claim 1 with an acoustic-loss value of from about 5 to about 40 dB/mm for said cyclic liquid vehicle, (2) a solid additive cyclic component with a melting point of from about 30 to about 74° C. and an acoustic-loss value of from about 25 to about 80 dB/mm, and which ink possesses an acoustic-loss value of from about 10 to about 80 dB/mm, and which ink possesses a viscosity of from about 1 centipoise to about 10 centipoise at a temperature of from about 125° C. to about 165° C.

5. An ink in accordance with claim 1 wherein the additive (2) is a cyclic solid compound.

6. A nonaqueous ink in accordance with claim 1 further containing ink additives.

7. An ink composition comprised of (1) a liquid cyclic vehicle (2) a component with a melting point of from about 30° C. to about 74° C., (3) a liquid crystalline nitrile compound, (4) a lightfastness component, (5) a lightfastness antioxidant, and (6) a colorant.

* * * * *